TELEPHONE SUBSTATION CIRCUIT WITH AUTOMATIC
COMPENSATION FOR LENGTH OF LINE

Filed Dec. 22, 1947 3 Sheets-Sheet 1

INVENTORS A. J. AIKENS
N. BOTSFORD
A. P. BOYSEN, JR.
E. DIETZE
W. D. GOODALE, JR.
A. H. INGLIS
BY John E. Cassidy
ATTORNEY INVENTORS A.J. AIKENS
N. BOTSFORD
A.P. BOYSEN, JR.
E. DIETZE
W.D. GOODALE, JR.
A.H. INGLIS
BY John E. Cassidy
ATTORNEY INVENTORS A. J. AIKENS
N. BOTSFORD
A. P. BOYSEN, JR.
E. DIETZE
W. D. GOODALE, JR.
A. H. INGLIS BY John E. Cassidy
ATTORNEY Patented Dec. 2, 1952 2,620,402

UNITED STATES PATENT OFFICE 2,620,402

TELEPHONE SUBSTATION CIRCUIT WITH AUTOMATIC COMPENSATION FOR LENGTH OF LINE

Nelson Botsford, Rutherford, Albert P. Boysen, Jr., Summit, Andrew J. Aikens, Boonton, Eginhard Dietze, Gillette, Walter D. Goodale, Jr., Convent Station, and Alfred H. Inglis, Upper Montclair, N. J., assignors to Bell Telephone Laboratories, Incorporated, New York, N. Y., a corporation of New York Application December 22, 1947, Serial No. 793,170

13 Claims. (Cl. 179—81)

This invention relates to improvements in subscriber telephone set circuits such as are located ordinarily in a telephone subscriber's premises and by means of which the subscriber may originate or receive a telephone call and communicate with a called or calling party.

An object of this invention is the improvement of subscriber telephone set circuits.

More particular objects of this invention are to improve the response and increase the efficiency of subscriber telephone circuits. The objectives of the invention are attained by what is essentially a complete redesign of the subscriber set circuit and by improvements in many of the individual apparatus elements comprising the circuit as well as by changes in the disposition and physical relationship of the units so that they cooperate more effectively and harmoniously in the station set.

A more specific object of the present invention is to provide a new subscriber's telephone set circuit which affords more uniform transmission and better quality on loops of differing lengths.

One of the important improvements in the circuit is an improvement in transmission equalization for connected loops of differing lengths. As is well known subscribers' premises are located at various distances, within a permissible range, from the telephone switching office and conductors of different gauges are employed in the interconnections. As a result of this there is considerable variation in the strength and clarity of signals received by the subscriber unless some means are employed for compensating for the differences. An important feature of this invention is an improved transmission equalizing feature to compensate for variations in loop lengths.

As a result of improvements during the past ten or twelve years, better telephone transmitting and receiving instruments have become available and presently further progress is being made in the improvement of the characteristics obtainable from such instruments.

Increased efficiency of the telephone transmitting and receiving instruments per se has tended to increase the amount of sidetone. By this is meant the reproduction in the local receiver of the signals generated in the associated local transmitter. If full advantage is to be taken of the improvements incorporated in the telephone transmitters and receivers per se, an improved subscriber circuit including better arrangements for compensating for variations in loop length and including as well an improved anti-sidetone feature is required. An important feature of this invention is an improved anti-sidetone circuit.

It is well understood by those familiar with the maintenance problem in the telephone industry that low incidence of trouble of subscriber telephone set circuits is of paramount importance, both from the standpoint of the subscriber's need for reliable service, as well as from the standpoint of the cost of clearing trouble in the very large number of these instruments, located as they are on the subscribers' premises and requiring a visit by a maintenance man for each failure.

As a result of the foregoing and other considerations, certain features, thought to be desirable from the standpoint of improved transmission, have not heretofore been widely incorporated in subscriber telephone set circuits because of the unreliability of the apparatus required. For instance, certain of the apparatus elements necessary for transmission equalization introduced a service hazard. These elements were susceptible to damage due to the application of ringing voltage or other voltages only slightly in excess of the relatively low voltages employed in telephony. A feature of the present subscriber telephone set circuit is a device applied to the equalizing element to protect it against damage due to high voltage.

The voltage protector for the equalizing element serves another very important purpose, as arranged in the present circuit, in that it also improves the equalization beyond that attainable by means of the primary equalizing element alone, so that the element which performs the primary function of protecting the voltage equalizer from damage due to excessive voltage is in fact also a cooperating equalizer of transmission for loops of different lengths and gauges.

In the present circuit the primary equalizer which is employed is the tungsten filament of a lamp connected in series with the subscriber transmitter, the resistance of which lamp increases as the connected loop is shortened. A lamp filament is employed for a special purpose. The receiver employed in the present circuit has an efficiency about five decibels higher than the receiver which it will widely replace. It is desirable to limit the gain in the receiver on short loops. In order to achieve this a thermistor is connected in shunt with the receiver and the resistance of the thermistor is controlled in response to the heat generated by the equalizer filament. On short loops the current in the equalizer filament will be high. Its resistance and the heat generated by it will be correspondingly high. The resistance of the thermistor will be decreased in response to the increased heat of the equalizer filament, and the shunting effect of the thermistor connected around the receiver will be increased, so that the level of the signal in the receiver will not be excessively high on short loops. A feature of the present invention therefore is a cooperating network of non-linear resistances connected in series and shunt relationship with the transmitter and receiver of a subscriber telephone set circuit to equalize the gain of these instruments on loops of differing lengths.

On short, unequalized loops, because of the high current there is a tendency for the relay which follows the dialed pulses at a mechanical exchange to saturate on the reception of each current pulse and therefore to release too slowly. An effective equalizer, as a result of reducing the current, and the transient effects thereof, on short loops, eliminates or at least reduces saturation. As a result of this it is now possible to reduce the time which the dial is required to be maintained open so as to effectively transmit discrete pulses.

On long loops this is a benefit, because on such loops the operate current available for the pulsing relay is reduced and the relay consequently is slow to operate and quick to release. By reducing the time that the contacts of the dial are required to be held open the operation of the pulsing relay connected to long loops is improved. Thus two additional advantages are afforded by the use of the present effective equalizer, namely, increased speed of dialing and satisfactory dialing on long loops.

There are other advantages realizable as a result of the invention of the present effective equalizer, which equalizer as arranged herein is capable of withstanding higher voltages than formerly without damage. An effective equalizer, by limiting the maximum battery supply current which flows through the elements connected in series in the loop, removes a serious restriction from the design of these elements, particularly from the design of the transmitter and the induction coil. When relatively high current flows through the transmitter, it tends to cause what is known in the art as burning noise, which is characteristic of transmitters in short loops. Transmitters formerly had to be designed to limit this effect. It is no longer necessary to take this factor into consideration due to the effective equalizer of the present invention.

By reducing the required maximum current carrying capacity of the inductance coil, as a result of the present effective equalizer, a smaller inductance coil, which coil may saturate at a lower current value, is adequate. Without effective and dependable equalization larger inductance coils which could withstand the maximum current without saturation were required.

It is important on the shortest connecting loops that the shunting effect of the thermistor connected about the receiver should not be so great as to reduce the level of the signal in the receiver excessively. To prevent this a linear resistance of relatively low magnitude is connected in series with the thermistor which shunts the receiver. A feature of the present invention therefore is a linear resistance in series with a non-linear resistance both connected in shunt to a receiver to improve transmission equalization in the receiver on loops of differing lengths.

A further feature of the invention, disclosed in an alternative embodiment, is a non-linear resistance having a negative coefficient of resistance in series with a limiting non-reactive resistance, both connected in shunt around the primary winding of the subscriber circuit inductance coil and the transmitter connected in series. As thus arranged the transmission is unaffected on long loops but on short loops the primary winding of the inductance is shorted thus reducing transmission in both the transmitter and receiver which are connected in series with a second winding of the inductance coil.

There is another well-known difficulty inherent in all subscriber telephone sets of the dial type, that is the interference caused in neighboring radio sets by the making and breaking of the circuit through the dial contacts as the dial is operated. There are presently available radio interference suppressors which are satisfactory in that they suppress the level of the signals generated by the dial, when the dial is operated, to a very low level. However, such presently known satisfactory suppressors employed in existing subscriber set circuits are relatively expensive per circuit unit and when one considers the very large number of telephone subscriber set circuits which are employed their provision generally represents a considerable sum. A feature of the circuit of the present invention is a radio suppressor which is equally as effective as, but less expensive than, the present satisfactory suppressor. This economy is effected largely by connecting a condenser and a non-inductive resistance, both in series, in shunt with the dial contacts, and connecting the outer end of the non-inductive resistance directly to a terminal of the inductance coil in the telephone set circuit, so that the inductance coil complements the suppressor elements in reducing the radiations due to the operation of the dial. The capacitance to ground of the connection between the dial and the induction coil should not exceed five micromicrofarads to obtain the benefits.

The utilization of the induction coil as an aid in suppressing radio interference due to dialing, by the direct connections as indicated, results in an additional reduction of from 10 to 20 decibels of the level of the radio interference signals generated by the operation of the dial. Further it has been found that if the length of the conductors interconnecting the switchhook adjacent the dial, through the dial, to the adjacent terminal of the induction coil be made very short, say two to four inches, so as to minimize their capacitance to ground, a very substantial reduction in radio interference due to switchhook operation is achieved in a manner which is more economical than any other known arrangement.

Most of the apparatus elements comprising the modern combined subscriber set circuit of the handset type, are located in a cavity in the supporting base or pedestal on which the handset is mounted. The telephone transmitter and receiver are connected to the other elements of the subscriber telephone set circuit by means of a number of flexible cords. A three-conductor cord has been widely employed in making the foregoing interconnection. It has been found however, that there are at least two advantages to be had from the employment of a four-conductor cord for making this interconnection, which advantages more than compensate for the cost of the additional conductor.

The first of these two advantages is that the use of the four-conductor cord makes it possible to employ shunt contacts which may be closed to protect the receiver from the effect of objectionable clicks due to the operation of the switchhook, as well as due to the operation of the dial, rather than series contacts which may be opened for the same purpose. As a result of employing series contacts in the subscriber sets as formerly arranged, contact troubles are a major item in subscriber telephone set maintenance. When contacts in series with the receiver do not close properly, the receiver is obviously open and the subscriber telephone circuit is inoperable. A call for a maintenance man is inevitable. Such opens are in most cases due to dirty contacts. When shunt contacts are employed to protect against objectionable clicks, failure of the contacts to close will result in clicks being heard as long as the condition persists but the telephone circuit continues to function. However, the contacts are arranged so that their operation effects a self-wiping of the contacts. In most cases of such opens of shunt contacts, the wiping of the contacts, as the circuit continues to be operated, will dislodge the dirt and, after a few operations, the contacts will again operate normally. This will result in a reduced number of calls for a maintenance man per subscriber circuit in a given time.

The second advantage obtainable from the four-conductor instead of the three-conductor cord is a reduction in cord noise. Cord noise usually arises in conductors carrying direct current. When a three-conductor cord is employed, one of the conductors is common to both the transmitter, which is connected in a direct current circuit, and the receiver. The direct current noise in this conductor is impressed on the receiver. With the four-conductor cord arranged as in the present invention, two conductors carrying direct current are individual to the transmitter and the two conductors individual to the receiver do not carry direct current. Any noise generated in the transmitter cord conductors, so far as the receiver in the circuit is concerned, will be reduced by the anti-sidetone circuit.

Attention should be called to the fact that the cord conductors of the modern telephone set are not individual wires but, to promote flexibility, each conductor is formed of a plurality of exceedingly fine flexible filaments of conducting material known in the art as tinsel conductors. There is naturally a limit to their length of service notwithstanding their superior flexibility. After a time a number of the individual filaments break. Some of the broken filaments will engage with and disengage from others, thus varying the conductor resistance, modulating the circuit and introducing noise. When the noise becomes objectionable the subscriber complains and a service maintenance man must call to replace the cord. The employment of the four-conductor, rather than the three-conductor cord, by minimizing the noise in the receiver, materially extends the useful life of the cord, thus minimizing the incidence of service maintenance man calls due to conductor noise.

In addition to the dial off-normal contacts mentioned above, which contacts shunt the receiver when the dial is off normal to minimize the effect of clicks, the circuit of the present invention is arranged so that a second set of dial off-normal contacts may be connected, optionally, in shunt around the transmitter and the filament of the equalizer, both in series, if desired. As the circuit of the present invention is preferentially arranged, the dial pulses pass through the transmitter and the equalizer filament. One difficulty encountered in transmitters employing a variable resistance, such as the carbon granule type of resistance, is that the closing and opening of the dial off-normal springs shunting the transmitter, at the start and end of each signal train, respectively, causes packing of the granular resistance of the transmitter. This reduces the efficiency of the transmitter. It has been found that when a radio suppression filter is employed dialing through the granular resistance results in less packing than does the operation of the shunting off-normal contacts.

In order to protect the listener from objectionable clicks due to sudden voltage peaks, the receiver is also shunted directly by a copper-oxide varistor, which serves as a click reducer. This click reducer limits the volume to a maximum below the threshold of feeling and is necessary with the ring-armature type receiver which is employed in the present set, because of the higher efficiency and higher overload point of the ring-armature receiver. Ring-armature type receivers are well known in the art, being described for instance in Patent 2,170,571, E. E. Mott, August 22, 1939, Patent 2,171,733, A. L. Thuras, September 5, 1939, and Patent 2,249,160, E. E. Mott, July 15, 1941. The click reducer is made an integral part of the receiver, thus insuring that it will always be directly associated with the receiver and affording some economy as compared with a separate receiver and click reducer. The click reducer, it has been found, materially reduces demagnetization of the receiver due to high voltages surges, making it possible to use a cheaper grade magnet.

Telephone subscriber set circuits presently widely employed are arranged so that they are opened and closed for the normal idle and operating condition at one point in one conductor only. The present circuit is arranged so that it is opened and closed at two points, namely at the junction with each of the two loop conductors. This is of advantage in minimizing electrolytic corrosion due to voltage on the induction coil winding, which obtains when only one conductor is opened. This is of advantage also in reducing trouble due to lightning and power line crosses. Another advantage of this arrangement is that it facilitates the adaptation of the circuit for various service applications such as for two-party message rate dial service.

The foregoing and other features will become apparent from the following description when read with reference to the associated drawings, in which.

Figure 1:
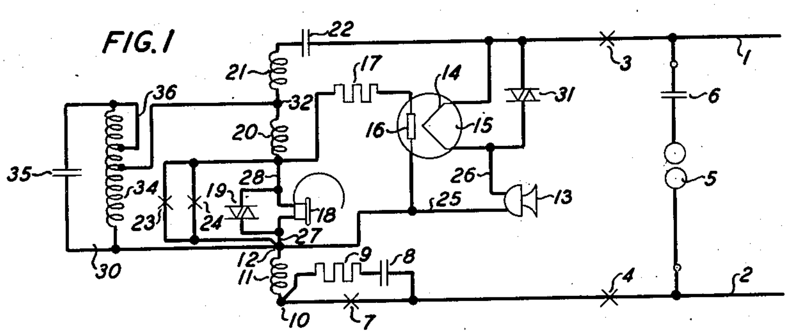
Fig. 1 shows the subscriber telephone set circuit of the present invention.
Figure 10:
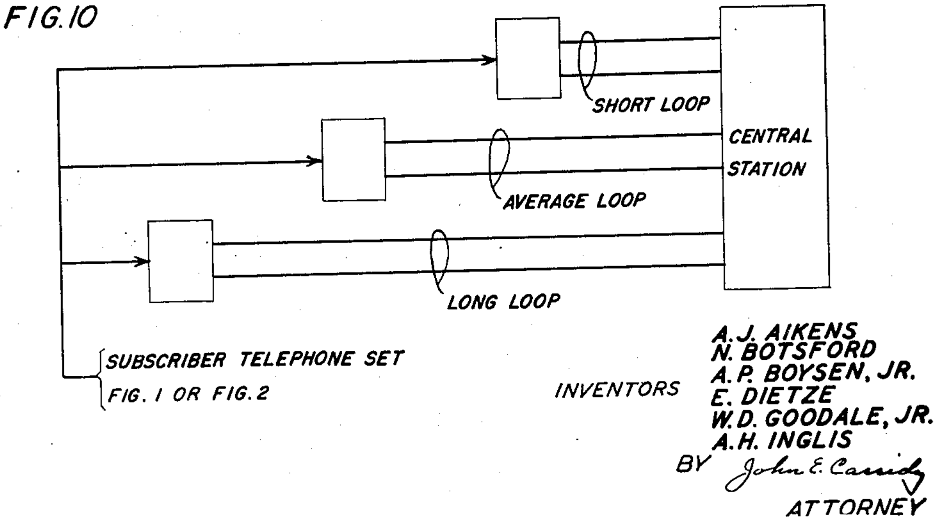
Fig. 10 represents a plurality of subscriber telephone sets, such as that of Fig. 1 or Fig. 2 herein, interconnected to a central station through loops of differing lengths, as in a typical telephone switching system.

Refer now to Fig. 1. In this figure two loop conductors, 1 and 2, are shown at the right, which conductors are assumed to extend to the central telephone switching exchange. A large number of such loops of differing lengths are interconnected between the subscriber telephone set circuits of the present invention which are located individually on the subscriber's premises and the central station, of which loops three only, namely a short loop, an average loop and a long loop, are indicated in Fig. 10 to typify the system. Bridged across conductors 1 and 2 to the right of the normally open switchhook contacts 3 and 4 are the ringer 5 and a condenser 6 arranged in series. As thus arranged, as is well understood, alternating current employed for ringing, when applied, will pass through the bridge and actuate the ringer, while the switchhook contacts are in the normal open condition. As mentioned, and for the reasons given in the foregoing, two switchhook contacts 3 and 4 are employed in the present circuit. The normally closed dial contacts 7 are bridged by condenser 8 and non-inductive resistance 9. The left-hand terminal of non-inductive resistance 9 is connected directly to the bottom terminal 10 of the lower winding 11 of the inductance coil. As mentioned above the conductors interconnecting the switch 4, dial 7 and terminal 10, as well as the conductors employed in the radio interference suppression shunt, are made as short as possible. The capacitance of condenser 8 is 0.1 microfarad. The magnitude of the non-inductive resistance 9 is 50 ohms.

It has been found that the dial contact shunt elements 8 and 9 alone are effective to suppress the level of the signals which interfere with reception in radio receivers by about 10 decibels when the connection of the left-hand end of non-inductive resistance 9 is not made to terminal 10 directly by means of a short conductor, as described. When the connection is directly to terminal 10 by means of a short conductor, the level of the interfering signals is further depressed by about 10 to 20 decibels, giving a total suppression of 20 to 30 decibels. Short connections between switch 4 and terminal 10 result, correspondingly, in much increased suppression of radio interference due to switchhook operation.

A low impedance transmitter branch circuit extends from upper terminal 12 of winding 11 of the induction coil through transmitter 13 and the tungsten filament 14 of an incandescent lamp 15, otherwise known as a ballast lamp, the upper terminal of which filament is connected to switchhook contact 3. Enclosed within the impervious envelope of lamp 15 and juxtaposed filament 14 is thermistor 16. Thermistor 16, in series with linear, non-inductive resistance 17, of about 50 to 100 ohms, is shunted directly around the ring-armature type receiver 18. Varistor 19 which comprises two copper-oxide resistance elements, arranged in parallel and poled oppositely, shunts receiver 18 directly and is mounted directly on the receiver so as to form a permanent part of the receiver assembly.

This same varistor 19 which is used as a click reducer also has the property that it protects the thermistor 16 against damage from clicks or other voltage surges which are too fast for operating the thermistor 16. Thermistor 16 has a slow response for voltage surges impressed on it. If a large current flows through it when it is in a low resistance condition it will burn out. The varistor click reducer 19, however, will respond to these fast surges and assume a low resistance state which then protects the thermistor 16 by draining off current from it.

The conductors connecting varistor 19 and the receiver 18 are made as short as possible. The receiver is connected in series with the windings 20 and 21 of the inductance coil and condenser 22 and in parallel with the transmitter 13 and filament 14 arranged in series. Windings 11, 20 and 21 constitute an inductance coil unit with winding 11 coupled inductively to windings 20 and 21. Dial off-normal contacts 23 shunt receiver 18. These contacts are normally open and are closed only during an interval starting slightly before and ending slightly after the initial opening and final closing of the loop circuit during the dialing of the trains of pulses which control the mechanical switching equipment at a central switching telephone office. Contacts 24 are controlled by the switchhook. They shunt receiver 18 and are normally closed while the circuit is idle. They open as the handset is removed from the cradle and reclose slightly before the circuit is opened when the switchhook is actuated. The function of the dial off-normal contacts and of contacts 24 is to prevent objectionable clicks in the listener's ear during dialing as well as when the switchhook is actuated.

The transmitter 13 and the receiver 18 together with its click reducing varistor 19 are mounted at the opposite ends of a tubular hand grip or handle. The instrument is called a handset. The remainder of the apparatus is mounted in the cavity in a base or pedestal, the upper portion of which forms a cradle for the handset. Switch contacts 3 and 4 are controlled by the handset, being open when the handset is placed in its cradle and closed when it is removed therefrom.

The conductors 25 and 26 connect the transmitter to the associated apparatus in the cavity in the base and the conductors 27 and 28 serve the same purpose for the receiver. These four conductors are so-called tinsel conductors and are formed into a single four-conductor cord. The advantages of this arrangement are described in the foregoing.

It has been found that the sequence of operation of the various switch contacts in the set is important if objectionable clicks in the listener's ear are to be avoided. Contact 4 and terminal 10 in Fig. 1 are physically closely spaced for the reasons described. Therefore, it is important that when the handset is lifted from the cradle contact 3 is arranged to engage first, contact 4 is made second and contact 24 is then opened. When the handset is restored to the cardle or when the cradle switch is operated for flashing the operator, contact 24 is arranged to close first, then contact 4 opens and finally contact 3 opens.

The anti-sidetone network 30, which will be more fully described hereinafter, is connected in shunt around the receiver 18 and winding 20 of the inductance coil arranged in series.

The varistor 31, which consists of one silicon carbide non-linear resistance element, shunts the tungsten filament 14, and performs the double function of protecting the filament from abnormally high voltage surges due to ringing, as well as improving the equalization afforded by the filament. The explanation of the manner in which varistor 31 performs this latter function is as follows.

The tungsten filament 14 has a relatively low resistance when cold which resistance increases in proportion, up to a limit, as the resistance grows hotter. Since the voltage applied at the central office is substantially constant, for each particular kind of service, the current through the transmitter would vary with loop length, being greatest for the shortest loop and decreasing as the loop is lengthened. The filament 14 by presenting increasing resistance to increased current tends to equalize the direct current for loops of differing lengths. Equalization of the transmitting volume depends not only on this equalization of the direct current but is attributable in even greater degree to the voice frequency loss of the filament resistance in the low impedance transmitter mesh.

It is pointed out that after the loop current has reached a certain value, additional current does not increase the output of the transmitter. It is desirable therefore from this point on to limit the loss increase of the equalizer. The varistor 31 has a characteristic opposite from that of filament 14. The varistor resistance decreases as the current through it increases. For small current values its resistance is so high that it does not affect the transmission loss. For higher loop current, such as that in short loops, the resistance of varistor 31 is sufficiently low so that it is comparable in magnitude with that of filament 14. For instance, for current of about 55 milliamperes, the resistance of the filament and of the varistor are equal, each being approximately 180 ohms, thus affording a combined resistance of 90 ohms. Therefore the loss of the combined filament varistor equalizer is reduced, as required, for the short loop high current condition, when further equalization of the transmitter would be a disadvantage because of the output versus current characteristic of the transmitter. This is one of the most important aspects of the present invention.

The thermistor 16 varies in resistance in response to changes in heat of the filament. As the heat of the filament increases, the resistance of the thermistor decreases. Thus on short loops the resistance of the thermistor shunt around the receiver will be low and a smaller proportion of current will flow through the receiver. The linear non-inductive resistance 17 limits the minimum resistance so that sufficient current will flow through the receiver on the shortest loops.

The new transmitter of the present circuit will be generally in accordance with that described in Patent 2,042,822, granted to A. F. Bennett and W. L. Tuffnell, issued June 23, 1936, except that it will be smaller and lighter and will employ a stabilized carbon. The new transmitter will weigh approximately .9 of an ounce instead of approximately 2 ounces for the present transmitter. The purpose of using the stabilized carbon is to reduce the customary increase in resistance of the transmitter with age and use, and to reduce the decrease in modulating efficiency. It is possible to work the carbon of the new transmitter harder than has been the practice because of the limiting effect of the ballast lamp on the battery supply circuit. The variable resistance granules of the new transmitter will have a carbon surface deposited from methane gas. The surface in one embodiment is deposited on coal. Alternatively, in a second arrangement, the surface may be deposited on quartz. In one arrangement of the variable resistance chamber, the chamber will be the same as that of Patent 2,042,822. In an alternative embodiment the chamber will be hermetically sealed to protect the carbon against contamination.

The new tubular handset, in the end portions of which the transmitter and receiver are mounted, will be shorter and four ounces lighter than those presently employed. The combined weight of the transmitter and receiver will be slightly more than three ounces instead of five ounces as at present. The object of making the handset shorter is to dispose the transmitter in closer proximity to the lips of the speaker when the handset is held with the receiver to the ear. It has been found that the best results are obtained when the distance from the center of the receiver to the center of the transmitter is approximately 5⅝ inches; the plane of the outer surface of the transmitter is at an angle of approximately 32½ degrees with the plane of the receiver; and the center of the transmitter is approximately 1¼ inches from the plane of the receiver.

Figure 9:
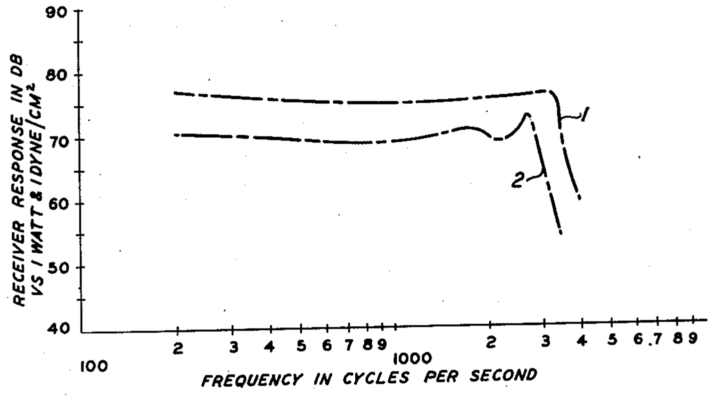
Fig. 9 shows a comparison of the frequency versus receiver response for the ring-armature type receiver employed in the present invention and another receiver.

Fig. 9 shows a measured characteristic, curve 1, of the ring-armature type receiver, to be employed in the present circuit, compared with a measured characteristic, curve 2, of the Western Electric Company HA1 receiver. The HA1 receiver is presently recognized in the art as being one of the best receivers. It will be noted that the new receiver is about 5 decibels up in volume as compared with that of the HA1 receiver and its frequency response extends about 800 cycles beyond that of the HA1 receiver.

Figure 8:
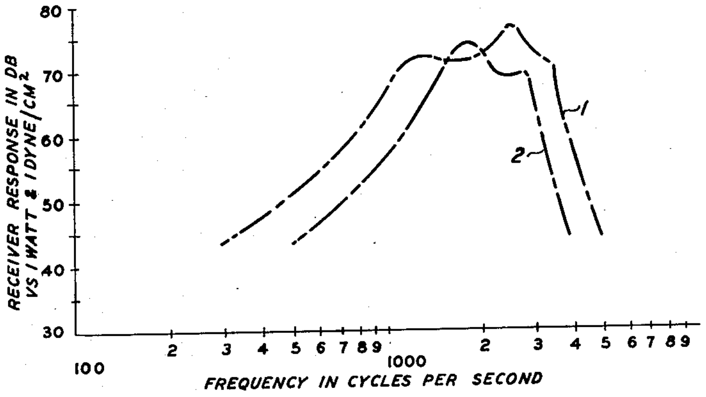
Fig. 8 shows the response of the ring-type receiver employed in the present set when held one-quarter inch off the ear as compared with that of another receiver so held.

The ring-armature type receiver, in addition, has a lower acoustic impedance or ratio of pressure to volume velocity, than other receivers, which aids reception when the receiver is held off the ear. Fig. 8 shows the response of the new receiver, curve 1, and of the HA1 receiver, curve 2, when both are held ¼ inch away from the ear. Leakage noise under the receiver cap of the new receiver is also reduced at the lower frequencies.

The transmitter employed in the circuit of the present invention, notwithstanding the fact that it is smaller and lighter than formerly employed, provides a volume gain of about 5 decibels which result from the accumulation of gains due to three factors as follows.

1. As a result of the employment of the improved equalizer of the present invention, the direct current through the transmitter will be limited to about 100 milliamperes. This makes it possible to increase the modulating efficiency of the transmitter without increasing transmitter noise.

2. By the use of stabilized carbon in the transmitter, loss in modulating efficiency with age is avoided and the resistance variations of the transmitter are reduced. This makes it possible to double the resistance of the transmitter when new, resulting in a gain in direct current power input.

3. A gain is obtained by the use of the shorter tubular handset handle as a result of disposing the transmitter closer to the lips of the talker. This gain more than offsets the loss due to a reduction in the diameter of the diaphragm, which is reduced from 2 inches to 1.8 inches in the interest of reduced weight of the handset.

On the basis of laboratory tests and quality computations, the required frequency characteristic of the new handset was determined. The set was arranged to cut off at an upper limit of 3600 cycles since the connected loaded line in the telephone plant cuts off at 3600 cycles and it is undesirable to have the receiving response extend beyond the range of the incoming signals. for improved articulation and naturalness it has been found that the over-all characteristic should rise about 6 decibels per octave up to 3000 cycles. Based on these considerations and the frequency response characteristics of the induction coil and the new receiver the characteristics for the required transmitter which are very closely approximated by the new transmitter are as shown in Fig. 6.

Figure 6:
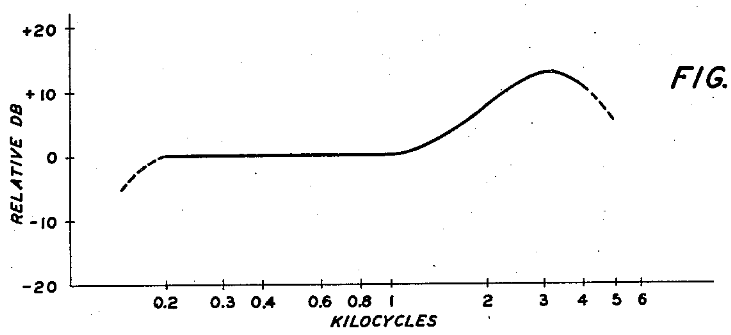
Fig. 6 shows the frequency versus relative decibels characteristic of the transmitter of the present set.

The curve in Fig. 6 shows the output of the transmitter referred to an 800-cycle value. That is to say, the output of the transmitter at 800 cycles is established as normal or zero and the variations in the output from normal for constant input over the full range of frequencies is established. The rise in output in the right-hand portion of the curve is about 6 decibels per octave up to 3000 cycles, which experience has shown desirable for the best results. It will be observed that at the left-hand portion of the curve, in the lower frequency range, below 200 cycles, the output is reduced, and at an increasing amount, the lower the frequency. The object of this is to reduce the transmission efficiency of breath sounds which are of low frequency, below 200 cycles.

The fundamental factors around which the transmission design of the subscriber set circuit of the present invention has been built are the transmitter and receiver having the characteristics described in the foregoing. General use of these instruments in the telephone system is made possible by the incorporation in the set circuit of the transmission equalization elements, for transmitting and receiving equalization, by improved sidetone balance, by a redesigned induction coil and by an improved transmission condenser.

Figure 7:
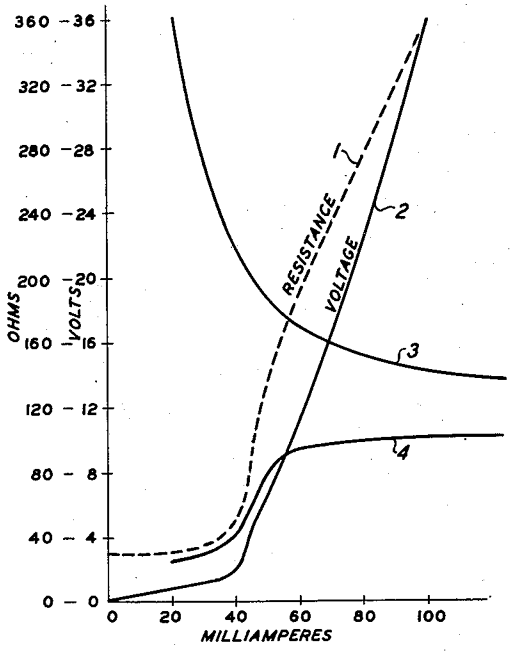
Fig. 7 shows the characteristics of the resistance lamp, of the varistor shunting the lamp and the combined characteristic thereof.

Refer now to Fig. 7.

Figure 5:
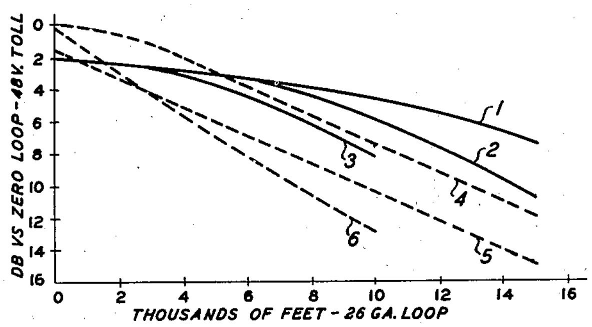
Fig. 5 shows the transmitting volume loop loss characteristic for the present circuit as compared with that of another having no equalization.

The resistance of the lamp filament 14 is shown in curve 1, the voltage across the lamp in curve 2, the resistance of the varistor 31 in curve 3 and the combined resistance in curve 4. The current on short loops is limited to a value which is generally less than 100 milliamperes. There is one exception to this. When the subscriber loop and station set circuit is connected to a 48-volt toll cord circuit the current on zero loop may be as high as 125 milliamperes. This limiting of the current through the transmitter as mentioned in the foregoing makes it possible to use the described transmitter without transmitter burning on short loops. The lamp filament, as may be observed in Fig. 1 is in the transmitter mesh of the station circuit, which mesh is of low impedance. This causes an appreciable volume loss on short loops. This affords very substantial equalization of the transmitting loop losses and especially avoids excessive transmitting volume or short loops, which volume, otherwise, considering the transmitter and receiver efficiency employed in the present set, would exceed the threshold of feeling under certain conditions. On long loops the equalizing filament resistance causes a loss of 1 decibel. The transmitting volume loop loss characteristics compared to those of the Western Electric Company 302 subscriber set, which is presently recognized in the art as being one of the best subscriber sets, are shown in Fig. 5. The solid lines represent the curves for the circuit of the present invention. The dotted lines represent the curves for the 302 set. Curves 1, 2, and 3 were obtained for three different central office conditions namely when the new set and subscriber loop were connected through 26 gauge loops to a 48-volt toll cord circuit, to a 48-volt local cord circuit and to a 24-volt local circuit, respectively.

Curves 4, 5 and 6 in Fig. 5 show the variations in loop losses in decibels for the 302 set for connection through 26 gauge loops of lengths indicated on the abscissa to a 48-volt toll cord, a 48-volt local cord and a 24-volt local cord, respectively. In these curves the zero loop condition for connection between the 302 set and a 48-volt toll cord is taken as zero. It should be observed that the curves for the 302 set incline downwardly to the right to a greater degree than do the curves for connection to corresponding cords for the new set, indicating a greater loss for the 302 than for the present set for lengthening loops in each instance.

Figure 4:
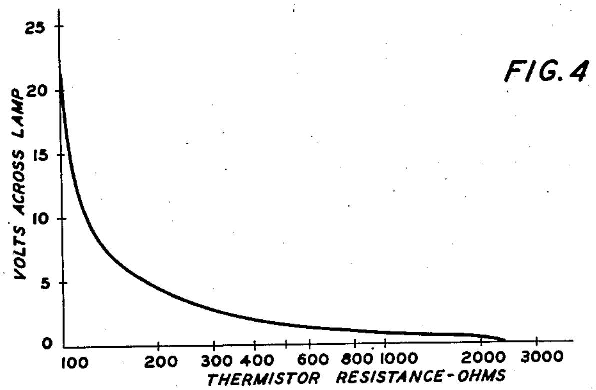
Fig. 4 shows a characteristic curve of the thermistor resistance versus the voltage drop across the filament of the equalizer lamp.

The curve of Fig. 4 shows the characteristic of the thermistor resistance 16 versus the voltage drop across filament 14. At zero volts the resistance of the thermistor is about 2500 ohms, so that on long loops, when small current flows through the filament 14, the resistance of the shunt around the receiver will be relatively high and approximately full current will flow through the receiver, since its resistance is relatively low. On shorter loops when the current in filament 14 is higher, the voltage across filament 14 will be in the range from 5 to 25 volts and the resistance of the thermistor will be lower, in the range from 180 to 100 ohms.

Figure 3:
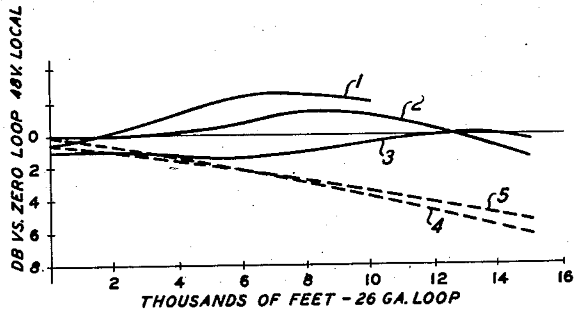
Fig. 3 shows the receiving volume loop loss characteristic for the present circuit as compared with that hitherto obtainable.

When the thermistor element 16 in series with non-inductive resistance 17 is shunted across the ring-armature receiver 13, which receiver has a 100 ohm impedance at 1000 cycles the receiving loss characteristic for the new set is as shown in Fig. 3.

The ordinate of curves 1, 2 and 3 in Fig. 3 shows the receiving volume loop losses for the condition whereunder the new set is connected through 26 gauge conductor loops of the lengths indicated in the abscissa to a 24-volt local cord circuit, a 48-volt local cord circuit and a 48-volt toll circuit, respectively, at the central office. These losses may be compared with those shown in curves 4 and 5 in Fig. 3. Curve 4 shows the receiving volume loop loss for the condition whereunder the 302 set is connected through 26 gauge loops of the lengths indicated either to a 24-volt or 48-volt local cord, the curves being identical over the greater portion of their length and except on loops of less than 3000 feet length, in which case there is a slight variation between them as the lengths of the loops approach zero. Curve 5 shows the receiving loop loss for connection to a 48-volt toll cord.

In the curves of Fig. 3 the zero loop condition for a 48-volt local cord is taken as zero loss. In each instance there is an increasing loss in the case of the 302 set as the loops are lengthened, whereas in the case of the new set the losses are substantially smaller on long loops. On short loops the losses of both sets are about the same for all three cord conditions. For short loops the receiving volume of the 302 set is satisfactory and any increase in the new set would be undesirable as it would result in reception which would be excessively loud.

Increasing the efficiency of the subscriber set necessitates a corresponding improvement in sidetone balance or there will be excessive sidetone which will cause complaints by the subscribers. The combined transmitting loop and receiving loop gain of the new set on long loops is approximately 10 decibels. The sidetone balance of the set must be improved by this amount on long loops. On short loops the sidetone is reduced by the action of the equalizer.

The following method was used in designing the balancing network 30 for the subscriber's set of the present invention. A variable impedance was connected across the balancing network terminals 12—32. Then a series of selected single frequencies, throughout the frequency range for which the set is designed, was applied to the transmitter circuit, and at each frequency the variable impedance was adjusted until the sidetone current in the receiver was zero. The variable impedance, that is the resistance and the reactance value, at each frequency and for each line condition were thus determined. The values of resistance and reactance required for each frequency were then plotted. A network having impedances corresponding to the plotted values would then provide low sidetone for all of the variable factors which affect sidetone balance, that is for the particular inductance coil, station condenser, etc. for the line conditions considered.

There then remains the problem of finding a physical embodiment of a balancing network that will conform to the plotted resistance and reactance values of the graph for the different frequencies. This may be computed mathematically but a satisfactory solution may be had by applying the graphical method taught by K. G. Van Wynen in his article "Design of Two Terminal Balancing Networks," published in the Bell System Technical Journal for October 1943.

The network indicated for the new subscriber set, by following the method described in the foregoing, is a two-terminal network having three parallel branches, namely, a resistance and an inductance in the first branch, a resistance only in the second branch, and a resistance and a relatively large capacitance in the third branch. It has been found however, that this network may be simulated closely by a small autotransformer having large losses and a small condenser arranged as shown in Fig. 1.

The balancing network actually employed in the new set, therefore, is an electrical simulation of the network indicated as required by the empirical measurement followed by the computation or graphical estimation described above. The simulating network consists, as shown in Fig. 1, of an autotransformer 34 having its low side connected to terminals 32 and 12 and its high side connected to a small capacitance 35 of about .2 microfarad. In addition, part of the winding is short circuited, as by connection 36, in order to provide dissipation. The dissipation introduced by the short circuit 36 around a portion of the transformer coil serves in lieu of the resistance. The small condenser 35 as a result of the action of the autotransformer is the equivalent of a larger condenser. The inductance of the autotransformer corresponds to that indicated as required in the fundamental network.

The anti-sidetone network employed in the new subscriber set affords improved sidetone balance as a result of two features as follows.

1. An anti-sidetone circuit depends upon a balanced Wheatstone bridge effect. To afford a good balance it is necessary in the particular circuit which has been chosen, that the self-impedances of the induction coil windings be infinite whereas their self-impedances are relatively low. The present balancing network is designed to take account of this distortion and to counteract its effect.

2. The network design is such that sidetone balance is obtained over the frequency range rather than at a single frequency as was the case in the anti-sidetone circuit of the 302 set which consisted of a single resistance. The extension of the sidetone balance over the frequency range is necessary with the new set because of the wider frequency response of the instruments. The new set is responsive to higher frequencies and sidetones at these frequencies produce buzzing sounds that would be particularly annoying. The new anti-sidetone circuit which is effective over the full range of frequencies eliminates the buzzing sidetones at high frequencies.

The new set in addition to providing 10-decibel increased volume on long loops without any increase in sidetone provides a frequency characteristic which simulates direct air transmission over a distance of one meter. This condition is commonly referred to as orthotelephonic transmission and is frequently used as a reference. The ear, due to refraction effects and other factors, has a broad resonance of about 13 decibels at 3000 cycles. This frequency characteristic is provided by the transmitter of the new set while the receiver characteristic is kept flat, as described in the foregoing, thus making the overall transmission orthotelephonic.

Figure 2:
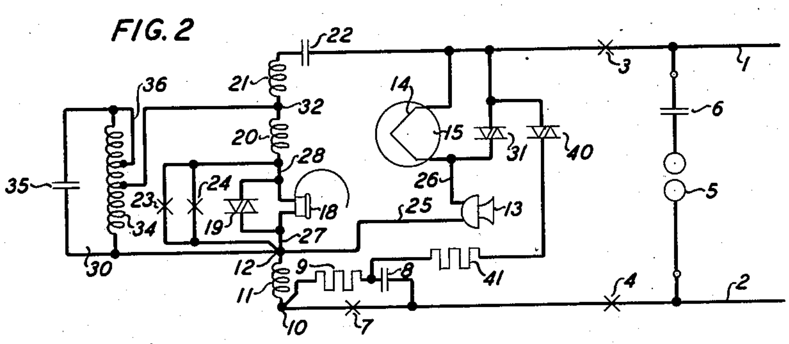
Fig. 2 shows a second embodiment of the circuit of Fig. 1.

Refer now to Fig. 2.

When the alternative embodiment shown in Fig. 2 is employed the thermistor 16 and resistance 17 employed in the arrangement per Fig. 1 are omitted. The varistor 40 and the resistance 41 in series with it, which limits the action of the varistor 40, are introduced into the circuit, connected as shown. The action of the varistor 40 is as follows: On long loops the current in the loop is low and the resistance of varistor 40 is very high, substantially open circuit, so that it has minimum effect on transmission. On short loops, as the loop current increases, the resistance of varistor 40 is reduced and current is shunted off through varistor 40. This reduces the battery supply for the transmitter. It also partially shorts the inductance of the primary winding 11 of the inductance coil. When one winding of a transformer is short circuited, all windings are short circuited, so that in effect a short circuit is also applied to windings 21 and 22 of the inductance coil. Upon the functioning of these windings the circuit efficiency of the receiving branch depends. Thus the input to the received is reduced as required on short loops.

What is claimed is:

1. In a telephone switching system, a plurality of subscriber telephone set circuits, each said circuit connected by an individual loop to a central station, said loops of differing lengths, a transmission equalizer connected individually in each of said set circuits, said equalizer having a first resistance element connected in series with the loop, the resistance of which first element increases gradually as the current through it increases gradually, to equalize the current on said loops of differing lengths, and a second resistance element, the resistance of which second element decreases substantially as the voltage across it increases, said second element connected directly in shunt with said first element to protect said first element against excessive voltage and to improve the equalization.

2. A subscriber telephone set circuit having a transmitter and a resistance transmission equalizer element, for equalizing transmission in loops of differing lengths, connected directly in series with said transmitter, said element having a positive coefficient of resistance, and a variable resistance, distinct from said transmitter, the magnitude of which variable resistance reduces substantially as the voltage across it increases, directly shunting said element.

3. In a telephone system, a central station, a plurality of loops of differing lengths connected to said central station, a subscriber telephone set circuit connectable to any of said loops, said set circuit having a low impedance branch comprising a transmitter and a first varible resistance element both connected in series, said first element having a positive cofficient of resistance to equalize transmission when said set circuit is connected to any of said loops, and a second variable resistance element having a resistance magnitude which decreases substantially as the voltage across it increases, said second element directly shunting said first element, to protect said first element and to improve the equalization afforded by said first element.

4. In a telephone system, a telephone central station, a plurality of loops of differing lengths connected to said central station, a subscriber telephone set circuit connectable to any of said loops, a telephone transmitter and a telephone receiver connected in a first and a second branch respectively across said loop circuit, a first transmission equalizing element connected in series with said transmitter in said first branch, said element decreasing the current through said transmitter as the length of said loop is reduced, a second transmission equalizing element connected in said second branch in shunt with said receiver, and coupling means between said two elements so as to control the current through said receiver in successive response to changes in said first and said second elements.

5. A subscriber telephone set circuit, a plurality of loops of differing lengths, a central station, said circuit connectable through any one of said loops to said central station, a telephone transmitter and a telephone receiver in said circuit, a first transmission equalizer, said equalizer a resistance having a positive coefficient of resistance, and a second heat responsive transmission equalizer in said circuit for controlling transmission through said transmitter and said receiver respectively, said equalizers disposed in close space relationship so that variations in loop current passing through said first equalizer due to said differing lengths, change the magnitude of an electrical characteristic of said first equalizer directly, and responsively of said second equalizer, so as to control the current in said transmitter and receiver.

6. A subscriber telephone set, a central station, loop conductors of differing lengths for connecting said set to said central station, a transmitter circuit and a receiver circuit in said set, a first transmission equalizer in said transmitter circuit, a second transmission equalizer in said receiver circuit, said equalizers varying the magnitude of transmission currents to compensate for variations in resistance of said loop conductors of differing lengths, said equalizers coupled in heat transfer relationship, so that said second equalizer is responsive to changes in heat of said first equalizer as a result of differences in current in said loops of differing lengths.

7. A subscriber telephone set having a transmitter circuit and a receiver circuit therein, a lamp filament transmission equalizer in one of said circuits, said equalizer increasing in resistance in response to increased current flowing through said one circuit, and a thermistor transmission equalizer in the second of said circuits in said set, said equalizers in close space relationship, said thermistor equalizer responsive to heat changes in said lamp filament equalizer, said thermistor equalizer decreasing in resistance in response to increase in heat, so as to limit the range of change in current in said transmitter circuit and in said receiver circuit.

8. A loop circuit, a subscriber telephone set connected to said loop circuit, a first transmission equalizing device in said set, said device consisting of two variable resistance elements connected directly in parallel in a direct-current path across said loop, one of said elements having a positive coefficient of resistance, the resistance magnitude of the other of said elements decreasing as the voltage across it increases, and a second thermistor equalizing device connected in an alternating-current path in said set, said second device responsive to heat changes in said element having said positive coefficient.

9. In combination in a subscriber telephone set, a telephone high efficiency ring type receiver having a frequency versus response characteristic over the range from 200 cycles to 3000 cycles per second of approximately 76 decibels, plus or minus one decibel, versus one watt and one dyne per centimeter square, a transmitter the response of which from 200 to 1000 cycles per second, referred to the response at 800 cycles per second as zero decibels, is substantially zero and which rises about 6 decibels per 1000 cycles over the range from 1000 to 3000 cycles per second, and a transmission equalizer circuit comprising a transmitter equalizer and a receiver equalizer controlled by said transmitter equalizer, said transmitter and said receiver connected in parallel branches, said transmitter equalizer connected in series with said transmitter, said receiver equalizer connected in parallel with said receiver, said transmitter equalizer having a positive coefficient of resistance, the magnitude of the resistance of said transmitter equalizer increasing directly in proportion to increases in current therethrough, so as to compensate for variations in the lengths of loops connected to said set.

10. In a telephone system, a central telephone station, a plurality of telephone loops of differing lengths connected to said central station, a subscriber telephone set having a transmitter and a receiver therein, said set connectable to any of said loops, a first transmission equalizer, the resistance of which equalizer varies substantially inversely with loop resistance, connected directly to said transmitter, a second transmission equalizer connected directly to said receiver and coupling means between said equalizers for controlling said second equalizer in response to variations in said first equalizer, to maintain a satisfactory transmission level of signals in said receiver on loops of differing lengths.

11. A subscriber telephone set circuit having a transmitter and a receiver, a first equalizer in said circuit, said equalizer consisting of a variable resistance having a positive coefficient of resistance connected in series in a low impedance branch with said transmitter and a second equalizer in said circuit, said second equalizer a thermistor connected in parallel with said receiver, said second equalizer responding to the effect of increased heat generated in said first equalizer due to increased current in the transmitting loop of said circuit, to reduce the magnitude of the current in said receiver.

12. In a telephone system, a central telephone station, a plurality of loops of differing lengths connected to said central station, a subscriber telephone circuit connectable to any of said loops, a telephone transmitter and a telephone receiver in said circuit, a heating element consisting of a first resistance the magnitude of which increases directly substantially in proportion to increases in current through said resistance, said first resistance connected in series with said transmitter in said circuit across said connected loop so as to tend to substantially reduce the variations in direct current flowing through said transmitter and said loops of differing length, a second resistance connected in shunt with said receiver in said telephone circuit across said connected loop, said first resistance coupled with said second resistance so as to form a heating unit therefor, said second resistance reducing in magnitude substantially in direct proportion to increased heating to tend to equalize the flow of voice currents through said receiver for said loops of differing lengths.

13. In a telephone system, a central telephone station, a plurality of loops of differing lengths connected to said central station, a subscriber telephone circuit connectable to any of said loops, a telephone transmitter and a telephone receiver in said circuit, a heating element consisting of a first resistance the magnitude of which increases markedly as the current through it increases, said first resistance connected in series with said transmitter in said circuit across said connected loop so as to tend to substantially reduce the variations in direct current flowing through said transmitter and said loops of differing length, a second resistance connected in shunt with said receiver in said telephone circuit across said connected loop, said first resistance coupled with said second resistance so as to form a heating unit therefor, said second resistance varying in magnitude responsive to said heating to tend to equalize the flow of voice currents through said receiver for said loops of differing lengths, and a third resistance shunting said first resistance, said third resistance having a relatively high magnitude when voltage of relatively low magnitude is impressed thereacross and having a relatively low magnitude when voltage of relatively high magnitude is impressed thereacross, to prevent further equalization by said first resistance beyond a predetermined value, beyond which value further equalization would be disadvantageous because of the characteristic of said transmitter.

ANDREW J. AIKENS.
NELSON BOTSFORD.
ALBERT P. BOYSEN, Jr.
EGINHARD DIETZE.
WALTER D. GOODALE, Jr.
ALFRED H. INGLIS.

REFERENCES CITED

The following references are of record in the file of this patent:

UNITED STATES PATENTS

| Number | Name | Date |
|---|---|---|
| 1,399,775 | Johnson | Dec. 13, 1921 |
| 1,442,427 | Edwards | Jan. 16, 1923 |
| 1,464,118 | Stokley | Aug. 7, 1923 |
| 1,518,440 | Meissner | Dec. 9, 1924 |
| 1,555,037 | Stone | Sept. 29, 1925 |
| 1,641,233 | Powell | Sept. 6, 1927 |
| 1,993,780 | Gooderham et al. | Mar. 12, 1935 |
| 2,164,033 | Halligan | June 27, 1939 |
| 2,202,386 | Koenig | May 28, 1940 |
| 2,260,296 | Christopher | Oct. 28, 1941 |
| 2,287,998 | Johnson | June 30, 1942 |
| 2,288,049 | Tillman et al. | June 30, 1942 |
| 2,360,233 | Hussey | Oct. 10, 1944 |
| 2,387,269 | Johnson | Oct. 23, 1945 |
| 2,431,306 | Chatterjea | Nov. 25, 1947 |